United States Patent
Thome et al.

(10) Patent No.: US 7,598,907 B2
(45) Date of Patent: Oct. 6, 2009

(54) SYSTEM AND METHOD FOR WWAN/WLAN POSITION ESTIMATION

(75) Inventors: Timothy Thome, Spring Valley, CA (US); Brian Norman Steuer, San Diego, CA (US)

(73) Assignee: Kyocera Corporation, Kyoto (JP)

( * ) Notice: Subject to any disclaimer, the term of this patent is extended or adjusted under 35 U.S.C. 154(b) by 0 days.

(21) Appl. No.: 11/952,008

(22) Filed: Dec. 6, 2007

(65) Prior Publication Data
US 2009/0146870 A1  Jun. 11, 2009

(51) Int. Cl.
G01S 1/02  (2006.01)
(52) U.S. Cl. .......................... 342/357.09; 342/357.12; 342/357.15
(58) Field of Classification Search ............ 342/357.06, 342/357.09, 357.14, 357.15, 357.12; 701/207, 701/213
See application file for complete search history.

(56) References Cited

U.S. PATENT DOCUMENTS

| | | | |
|---|---|---|---|
| 2002/0167441 A1* | 11/2002 | McBurney et al. | 342/357.03 |
| 2003/0210656 A1* | 11/2003 | Biacs et al. | 370/252 |
| 2005/0078652 A1 | 4/2005 | Rousseau et al. | |
| 2005/0288861 A1* | 12/2005 | Abraham et al. | 701/213 |
| 2006/0063536 A1 | 3/2006 | Kim et al. | |
| 2007/0182631 A1 | 8/2007 | Berlinsky et al. | |
| 2008/0032706 A1* | 2/2008 | Sheynblat et al. | 455/456.1 |
| 2008/0160952 A1* | 7/2008 | Bull et al. | 455/404.2 |

FOREIGN PATENT DOCUMENTS

| | | |
|---|---|---|
| WO | WO 2005/074169 | 8/2005 |
| WO | WO 2008/049131 | 4/2008 |

OTHER PUBLICATIONS

Keating, Tom. "WiFi and GPS to solve e911 issue". Jan. 3, 2006, http://blog.tmcnet.com/blog/tom-keating/gps/wifi-and-gps-to-solve-e911-issue.asp.

Bowen, Calvert et al., "A Survey of Location Privacy and an Approach for Solitary Users", Proceedings of the 40th Annual Hawaii Intl Conference on System Scienes, Jan. 1, 2007.

* cited by examiner

Primary Examiner—Dao L Phan

(57) ABSTRACT

Apparatuses and methods for implementing the GPS positioning functionalities in devices that are capable of communicating using IP packets are disclosed. The aiding-information-enhanced GPS positioning (IAIE-GPSP) technique is decoupled from the specific requirements of specific telecommunication networks and protocols (such as CDMA). By decoupling the IAIE-GPSP capability from specific telecommunication network/protocol requirements, embodiments of the invention enable any type of device, irrespective whether a voice communication capability is present, to be endowed with GPS positioning functionalities and to enjoy the rapid GPS position fix facilitated by the aiding information.

25 Claims, 4 Drawing Sheets

SYSTEM AND METHOD FOR WWAN/WLAN POSITION ESTIMATION

FIELD OF THE INVENTION

The invention relates to Global Positioning System (GPS) circuitry for use in electronic devices and techniques for implementing the same.

BACKGROUND

The Global Positioning System (GPS) has long been employed by the military to accurately determine the position of any given person or object around the globe. In the civilian arena, GPS-based applications have also proliferated. GPS positioning has been employed for purposes as diverse as navigation, farming, telecommunication, location-based marketing and advertising, etc.

GPS circuitry can now be found in many consumer devices. In a typical GPS navigation device, for example, a GPS receiver circuit receives GPS signals from a set of GPS satellites. The GPS receiver circuitry determines its own position from the received GPS signals, and can also determine the required course and speed to navigate to other locations if desired. GPS circuitry is also found in mobile telecommunication devices, such as cellular mobile handsets. By offering position-based functionalities (such as navigation, location-based searching, marketing, advertising, etc.), manufacturers and network operators entice telecommunication consumers with an increasing array of sophisticated features and services, thereby enhancing profitability and/or user satisfaction.

GPS-equipped cellular phones have certain particular requirements that manufacturers strive to satisfy. Generally speaking, the GPS circuitry in a typical cellular phone needs to be inexpensive, relatively small in form factor and sufficiently rugged to integrate with a typical consumer's mobile handset, and to consume a relatively low amount of power to extend the battery life of the typical mobile handset. Furthermore, the GPS circuitry in a typical cellular phone needs to have a rapid position acquisition capability to satisfy a technically unsophisticated but demanding and fickle consumer base. Thus, while a trained pilot may be satisfied with a thirty-second GPS cold start at the beginning of a multi-hour flight (i.e., the GPS receiver takes 30 seconds to fix its position), a typical consumer loses interest if the position-based application in his cell phone is not available instantly or within a short time after he turns on his cellular phone or after he moves to a given location.

To satisfy the particular demands of the consumer market, GPS positioning in cellular handsets has long been accomplished with the assistance of a cellular network. For example, in order to minimize the delay in acquiring the GPS position and/or to assist a cellular handset in acquiring its GPS position in a difficult RF environment, the cellular network typically provides "aiding hints" to the GPS circuitry in the cellular handset to allow the GPS circuitry to more quickly fix its GPS position.

To facilitate discussion, FIG. 1 illustrates a simplified CDMA (Code Division Multiple Access) network 100 having a plurality of cellular transmission towers 102, 104, and 106. For signal transmission management purposes, the spatial region in the vicinity of each cellular tower tends to be divided into a plurality of sectors. A given cellular phone may be assigned to a particular sector of a particular cellular transmission tower for communication purposes. In the example of FIG. 1 tower 102 is shown with sectors 102a, 102b, and 102c; tower 104 is shown with sectors 104a, 104b, and 104c; and tower 106 is shown with sectors 106a, 106b, and 106c. The towers themselves tend to be connected using high-speed transmission optical, wired, or wireless links, which may utilize a protocol such as SS7 for communication purposes. These communication links are shown as communication links 120, 122, and 124 in FIG. 1.

A CDMA network switch 128, representing for example a MSC switch, is also shown. A CDMA Positioning Determining Entity (PDE) 130 is shown coupled to CDMA network switch 128. CDMA PDE 130 represents the network logic that enables the GPS positioning capability in the CDMA mobile handsets (such as CDMA MS 112). CDMA PDE 130 communicates with the CDMA mobile handsets to offer GPS position-based functionalities while these CDMA mobile handsets are within CDMA network 100.

Generally speaking, CDMA PDE 130 works cooperatively with CDMA network 100 and CDMA MS 112 and relies on certain CDMA-specific features and information provided by CDMA network 100 and CDMA MS 112 to generate aiding hints and to provide these aiding hints to CDMA MS 112. The aiding hints enable CDMA MS 112 to more quickly and/or more efficiently acquire the requisite GPS signals from the GPS satellites (such as GPS satellites 140, 142, and 144 of FIG. 1). Once CDMA MS 112 acquires the requisite GPS signals with the assistance of the PDE-provided aiding hints, CDMA PDE 130 may assist CDMA MS 112 in resolving these GPS signals (taking into account network-specific and circuit-specific delays and offsets) into useful GPS information, such as the exact GPS position of CDMA MS 112.

To facilitate discussion, FIG. 2 illustrates a simplified GPS position acquisition process for a typical CDMA mobile handset, such as CDMA MS 112 of FIG. 1, while the CDMA mobile handset is within the CDMA network. The GPS position acquisition process begins with the establishment of a session (202) between CDMA MS 112 and CDMA PDE 130 via the transmission facilities (e.g., towers and switches) of CDMA network 100. Generically speaking, the GPS session may be thought of as a call between CDMA MS 112 and CDMA PDE 130 for information exchange purposes.

In step 204, CDMA PDE 130 requests information (such as certain sector-related identification and timing information) from CDMA MS 112 for AFLT (Advanced Forward Link Trilateration) purposes. In step 206, CDMA MS 112 furnishes the requested information, such as the sector-related information for the transmission towers sectors that CDMA MS 112 detects. The furnished information is employed (210) by CDMA PDE 130 to compute (e.g., triangulate in step 208) the rough location of CDMA MS 112 in CDMA network 100.

In step 212, CDMA PDE 130 sends aiding data, which is based on the calculated AFLT position, to CDMA MS 112 to enable CDMA MS 112 to more quickly obtain its GPS signals. For example, CDMA PDE 130 may send the identifying data pertaining to the subset of GPS satellites that CDMA MS 112 most likely will be able to lock on based on the calculated AFLT position, GPS timing estimates, GPS Doppler estimates, etc. This aiding information reduces the searching effort that CDMA MS 112 needs to perform to acquire the requisite GPS signals.

For example, CDMA MS 112 may direct the search only to the GPS satellites identified in the aiding information and may skip all other GPS satellites not identified in the aiding information. As another example, CDMA MS 112 may employ the GPS timing data and GPS Doppler data in the aiding information to more efficiently synchronize itself for GPS signal acquisition purposes.

In step 214, CDMA MS 112 may return raw GPS signal data (if found) to CDMA PDE 130. Since CDMA PDE 130 is not as severely constrained in terms of form factor and/or power usage requirement, there may be more processing capability within CDMA PDE 130 (compared to the processing capability in CDMA MS 112) to more quickly calculate the GPS position from the returned raw GPS signal data. Once the GPS position of CDMA MS 112 is determined, GPS position-based applications and features may become available to the user of CDMA MS 112 while CDMA MS 112 is inside CDMA network 100.

While the aforementioned GPS position acquisition process tends to work adequately for cellular mobile handsets, there are drawbacks. For example, CDMA PDE is highly specific to the RF, electrical, physical layout, and protocol characteristics of CDMA network 100. This is because CDMA PDE needs to account for chip-related delays, physical transmission delays due to specific component layout, protocol-related issues, network functions, and other particularities of CDMA network 100 to be able to compensate for these particularities and to provide reasonably accurate GPS and timing hints to CDMA MS 112.

Likewise, the AFLT position calculation process in the CDMA PDE 130 that employs the MS-furnished CDMA sector data to calculate the rough position of CDMA MS 112 is highly specific to, for example, the network tower locations and transmission characteristics of a particular CDMA network, as well as on the specific data and timing format and requirements of the CDMA protocol. While the tight coupling between the GPS position acquisition process and the CDMA network/protocol presents little difficulty for CDMA cellular mobile handsets within a CDMA network, such tight coupling also implies that these CDMA cellular mobile handsets lose some or all of their GPS functionalities and features when traveling outside of the reach of the CDMA network and its CDMA-specific PDE.

Nowadays, there exists a new class of cellular mobile devices that can interoperate across networks and protocols. For example, some multi-mode cellular mobile handsets are designed to operate across CDMA, WiFi, and/or WiMax networks. Since the GPS functionality is dependent on the existence of the CDMA network and/or the CDMA PDE and its knowledge of the specific CDMA network and protocol, users of such multi-mode cellular mobile handsets may be unable to access GPS position-based functionalities while roaming outside of the CDMA network into a WiFi network or a WiMax network.

In these cases, such a user may notice that he may make and receive calls in a non-CDMA network but may otherwise be unable to use his GPS position-based features and/or be able to obtain a quick GPS position fix due to the lack of CDMA network aiding information. Such failures may lead the user to believe that his cellular phone or the network has somehow malfunctioned, and may result in user frustration and dissatisfaction. If the user is sufficiently dissatisfied, the user may cancel the GPS feature altogether, resulting in a loss of revenue for the network operator.

SUMMARY

The invention relates, in an embodiment, to a method for implementing global positioning system (GPS) positioning for an electronic device. The method includes providing a positioning determining entity (PDE) and establishing a communication session between the PDE and the electronic device. The communication session is accomplished via a first plurality of IP (Internet Protocol) packets. The method also includes determining, using the PDE, a coarse location for the electronic device responsive to information obtained via the communication session. The method additionally includes formulating aiding information based at least in part on the coarse location. The aiding information is formulated by the PDE and including at least synchronization timing information and ephemeris information pertaining to a plurality of selected GPS satellites. The plurality of selected GPS satellites represent a subset of all available GPS satellites. The method further includes transmitting the aiding information from the PDE to the electronic device via a second plurality of IP packets, the aiding information being configured to assist the electronic device in acquiring GPS signals from at least one of the plurality of selected GPS satellites.

In another embodiment, the invention relates to a method, in an electronic device, for implementing global positioning system (GPS) positioning with the assistance of a positioning determining entity (PDE). The method includes establishing a communication session between the electronic device and the PDE that involves transmitting a first plurality of IP (Internet Protocol) packets from the electronic device to the PDE. The information exchanged during the communication is configured to assist the PDE in establishing coarse location information for the electronic device. The method further includes receiving a second plurality of IP packets from the PDE, the second plurality of IP packets including at least aiding information. The aiding information includes at least synchronization timing information and ephemeris information pertaining to a plurality of selected GPS satellites. The plurality of selected GPS satellites represent a subset of all available GPS satellites. The method additionally includes acquiring GPS signals from at least one of the plurality of selected GPS satellites using the aiding information.

In yet another embodiment, the invention relates to a circuit for implementing global positioning system (GPS) positioning in an electronic device with the assistance of a positioning determining entity (PDE). The circuit includes means for transmitting a first plurality of IP (Internet Protocol) packets to the PDE. The circuit also includes means for receiving a second plurality of IP packets from the PDE. The second plurality of IP packets includes at least aiding information. The aiding information includes at least synchronization timing information and ephemeris information pertaining to a plurality of selected GPS satellites. The plurality of selected GPS satellites represent a subset of all available GPS satellites. The circuit additionally includes means for acquiring GPS signals from at least one of the plurality of selected GPS satellites using the aiding information.

The above summary relates to only one of the many embodiments of the invention disclosed herein and is not intended to limit the scope of the invention, which is set forth is the claims herein. These and other features of the present invention will be described in more detail below in the detailed description of the invention and in conjunction with the following figures.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
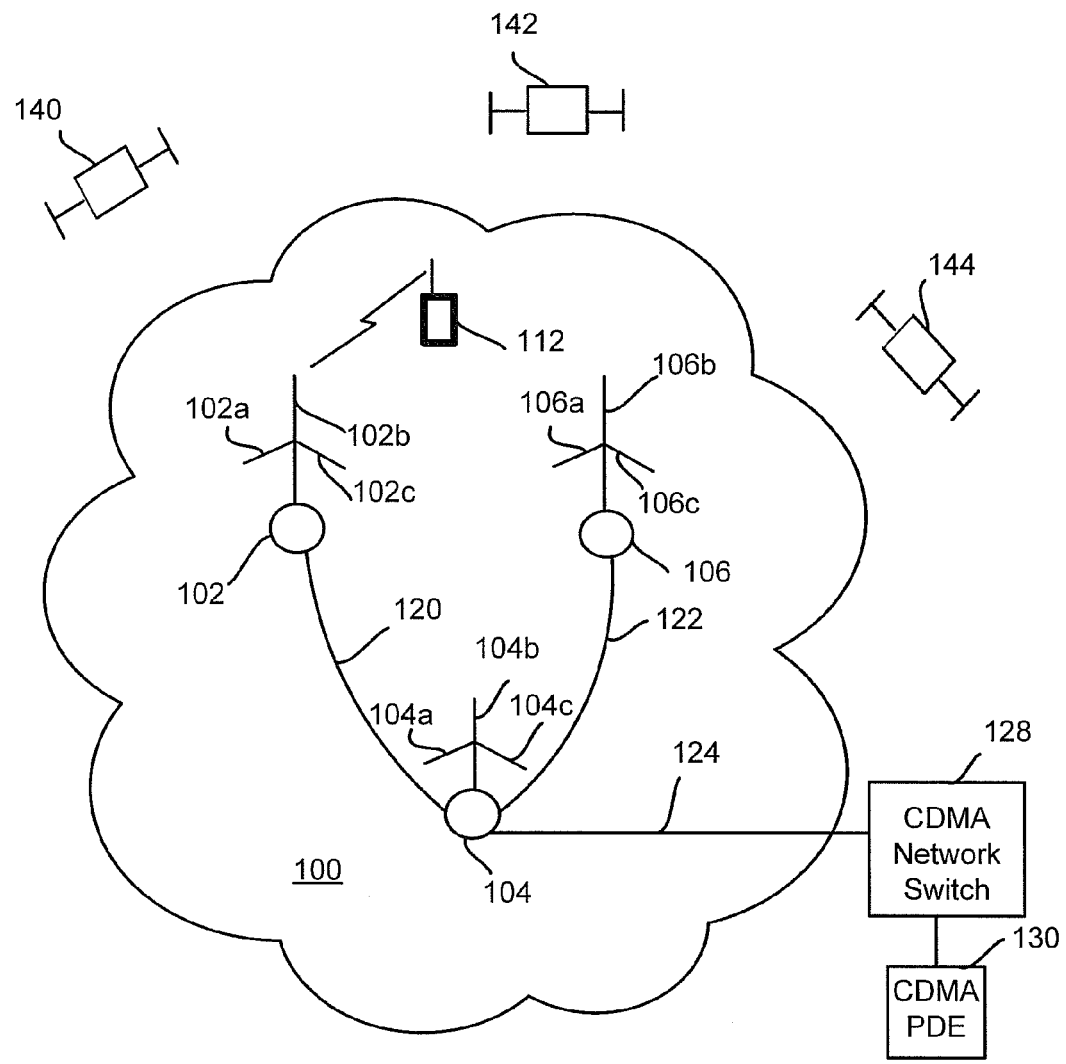
FIG. 1 illustrates a simplified CDMA (Code Division Multiple Access) network to facilitate discussion.
Figure 2:
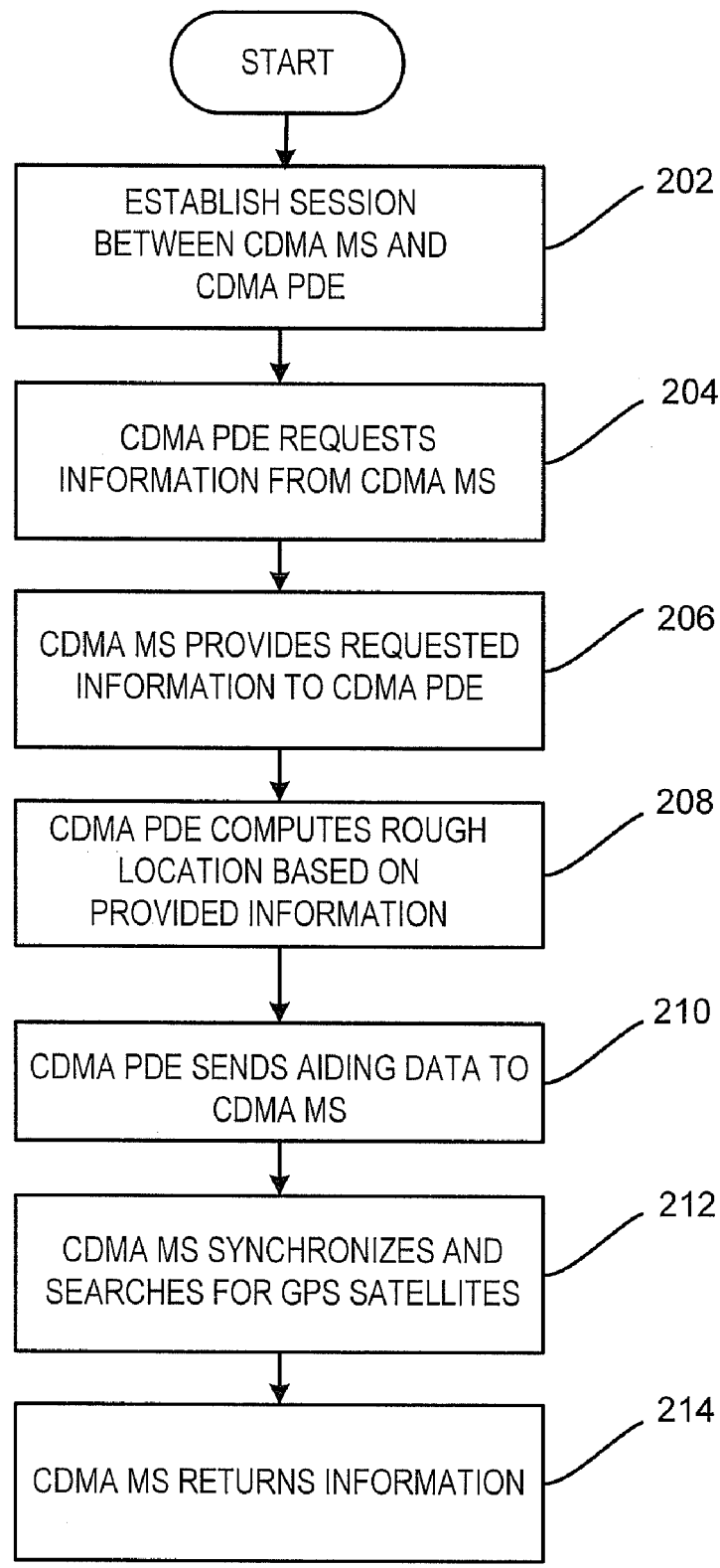
FIG. 2 illustrates a simplified GPS position acquisition process for a typical CDMA mobile handset while the CDMA mobile handset is within the CDMA network.

The present invention will now be described in detail with reference to a few embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention.

Various embodiments are described herein below, including methods and techniques. It should be kept in mind that the invention might also cover an article of manufacture that includes a computer readable medium on which computer-readable instructions for carrying out embodiments of the inventive technique are stored. The computer readable medium may include, for example, semiconductor, magnetic, opto-magnetic, optical, or other forms of computer readable medium for storing computer readable code. Further, the invention may also cover apparatuses for practicing embodiments of the invention. Such apparatus may include circuits, dedicated and/or programmable, to carry out operations pertaining to embodiments of the invention. Examples of such apparatus include a general purpose computer and/or a dedicated computing device when appropriately programmed and may include a combination of a computer/computing device and dedicated/programmable circuits adapted for the various operations pertaining to embodiments of the invention.

Embodiments of the invention relate to apparatuses and methods for implementing the GPS positioning functionalities in devices that are capable of communicating using IP packets, including mobile devices. In one or more embodiments of the invention, the inventive aiding-information-enhanced GPS positioning (IAIE-GPSP) technique is decoupled from the specific requirements of specific telecommunication networks and protocols (such as CDMA). By decoupling the IAIE-GPSP capability from specific telecommunication network/protocol requirements, embodiments of the invention enable any type of device, irrespective whether a voice communication capability is present, to be endowed with GPS positioning functionalities and to enjoy the rapid GPS position fix (e.g., acquisition of the requisite GPS signals sufficient to establish the location of the electronic device) facilitated by the aiding information.

Furthermore, since specific telecommunication network/protocol knowledge and features are not required for implementing the inventive aiding-information-enhanced GPS positioning (IAIE-GPSP), a mobile handset equipped IAIE-GPSP can continue to provide GPS functionalities, including the rapid GPS position fixing capability, while traveling outside of a specific telecommunication network. Thus, unlike the prior art, a CDMA mobile handset can continue to provide GPS functionalities, including the rapid GPS position fixing capability, when roaming outside of the CDMA network. If such a CDMA mobile handset has a multi-mode capability (such as CDMA/WiFi, CDMA/WiMax, or CDMA/WiFi/NiMax), that CDMA mobile handset can continue to provide GPS functionalities, including the rapid GPS position fixing capability, when roaming out of a CDMA network into another network (such as a WiFi network or a WiMax network). WiFi is a wireless technology currently based on the IEEE 802.11 standard (www.wi-fi.org). WiMax (www.wimaxforum.org) is a wireless technology currently based on the IEEE 802.16 standard and is designed for transmission over longer distances relative to WiFi. Both WiFi and WiMax are well known to those skilled in the art and will not be elaborated here.

In one or more embodiments, the timing synchronization data required for rapid GPS acquisition by the mobile device is advantageously synchronized to absolute GPS time. By allowing both the IAIE-GPSP mobile device and a corresponding Positioning Device Entity (PDE) to synchronize to absolute GPS time, the need for synchronizing to network time (such as CDMA time) is eliminated.

In one or more embodiments, the GPS time is obtained by the IAIE-GPSP PDE from an NTP (Network Time Protocol) server. As is well-known, NTP is an established protocol designed to synchronize clocks of computer systems over packet-switched networks. The operational details of NTP are illustrated in, for example, RFC 778, RFC 891, RFC 956, RFC 958, and RFC 1305, available from the Internet Engineering Task Force (www.ietf.org). In so doing, the dependency on a particular network (such as CDMA) is eliminated as far as time synchronization data is concerned. This approach substantially simplifies timing synchronization issues, thereby allowing GPS timing synchronization to be performed in a manner that is both efficient and free of specific telecommunication network constraints.

In one or more embodiments, the IAIE-GPSP is implemented additionally or alternatively to the prior art GPS positioning technique. In other words, in some embodiments, the IAIE-GPSP can supplement and improve the GPS positioning functionalities provided by the prior art GPS positioning circuitry. If the IAIE-GPSP circuitry fails to provide a satisfactory GPS position fix, the prior art logic may be employed to provide the required GPS position fix (albeit only when within a telecommunication network such as the CDMA network). In other embodiments, the IAIE-GPSP is implemented as an alternative to the prior art GPS positioning technique, thereby simplifying device implementation.

Figure 3:
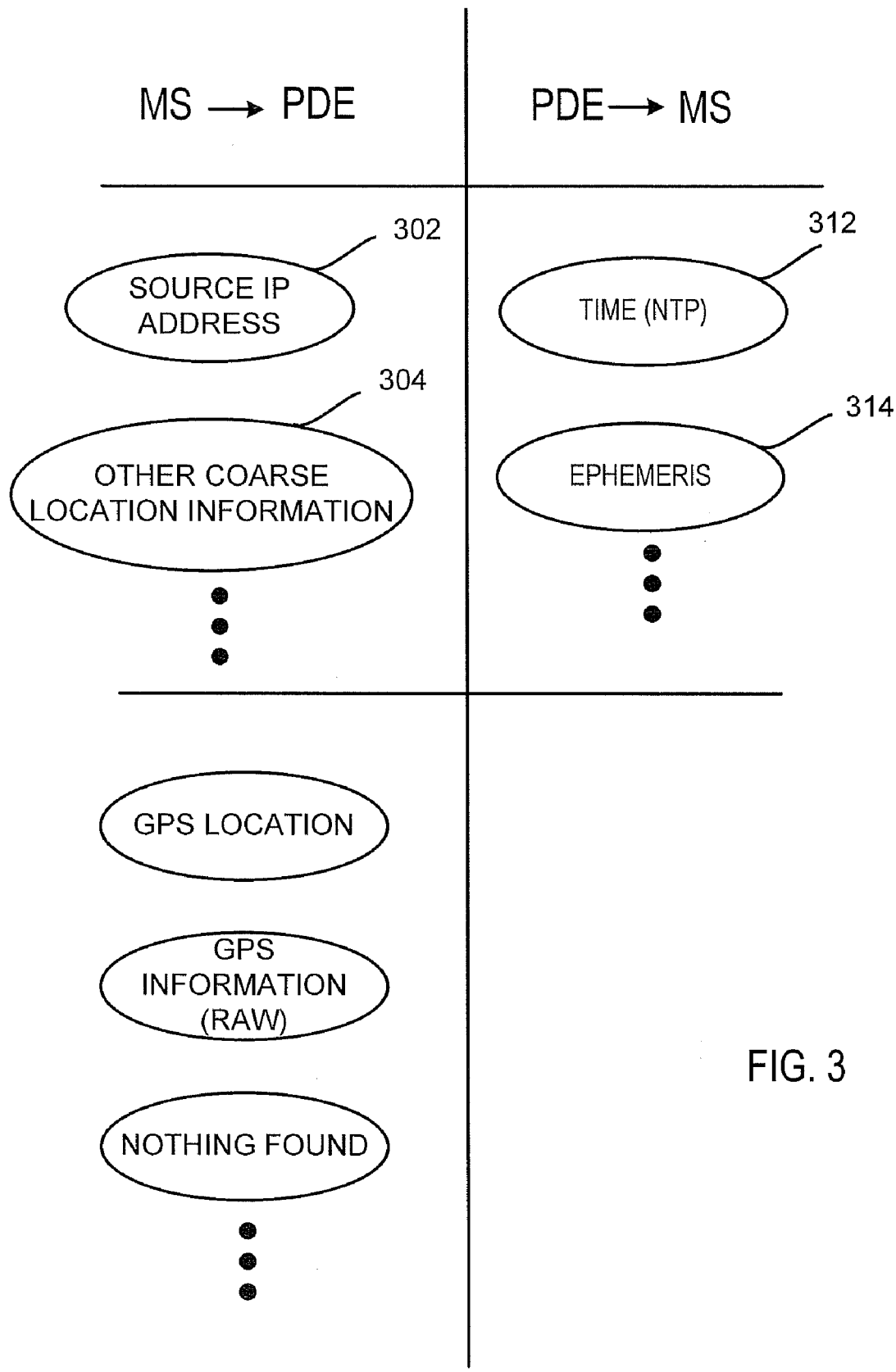
FIG. 3 shows, in accordance with one or more embodiments of the invention, a simplified IAIE-GPSP data flow.

The features and advantages of various embodiments of the invention may be better understood with reference to the figures and discussions that follow. FIG. 3 shows, in accordance with one or more embodiments of the invention, a simplified IAIE-GPSP data flow. In the data flow of FIG. 3, specific telecommunication network/protocol knowledge and information (such as CDMA network, CDMA protocol, and CDMA timing) are not absolutely required to achieve an aiding-information-enhanced GPS positioning (IAIE-GPSP) fix. Conceptually speaking, the aiding-information-enhanced GPS positioning functionalities implemented by the IAIE-GPSP are decoupled from telecommunication network specifics (e.g., CDMA network, CDMA protocol, SS7, and CDMA timing) and implemented instead using IP-based (Internet Protocol) solutions.

In this manner, the IAIE-GPSP can interoperate across any network that is capable of carrying IP traffic, including telecommunication networks such as CDMA networks as well as non-CDMA networks such as WiFi, WiMax, and others. This last point is important since the use of IP technologies for GPS aiding-information-enhanced positioning renders the solution portable to any environment in which IP packets can be exchanged to/from the IAIE-GPSP device. Thus, not only is the cellular network eliminated as an absolute requirement for aiding-information-enhanced GPS positioning, the device that is capable of IAIE-GPSP functionalities does not have to be a cellular phone device in the traditional sense. In effect, any device that communicates using IP packets (including for example cameras, desktop computers, automotive circuitries) can be endowed with IAIE-GPSP functionalities.

Further, the IAIE-GPSP PDE is also portable to any environment/network that employs IP packets for communication. It is contemplated that the IAIE-GPSP PDE may be provided as a commercially available hardware and/or software solution for sale or lease in order to provide the IAIE-GPSP function for any IAIE-GPSP device that communicates with such IAIE-GPSP PDE to obtain aiding information data and/or to access GPS-based applications and/or data therein.

In the data flow of FIG. 3, the communication between the mobile device and the corresponding IAIE-GPSP PDE (which also implements the IAIE-GPSP functionalities using IP-based technologies) can be structured as a series of exchanged messages over IP packets. The mobile device endowed with the IAIE-GPSP logic may initiate (or the IAIE-GPSP PDE may initiate) a session. The IAIE-GPSP PDE represents a server or computer that is communicably coupled to communicate with the mobile device using packet-based technologies. In one or more embodiments, the IAIE-GPSP PDE may be located at any suitable geographic location in a network (e.g., LAN, WLAN, or the internet) without limitation.

This session, being conducted via IP packets, employs the IP address of the mobile device and the IP address of the IAIE-GPSP PDE as source and destination IP addresses. The IP address of the mobile device may, in one or more embodiments, provide coarse location information of the mobile device to the IAIE-GPSP PDE. In one or more embodiments, the public IP address (302) associated with the mobile device allows the IAIE-GPSP PDE, by looking up DHCP and DNS databases for example, to obtain a rough location for the mobile device. Reverse DNS lookup and/or DHCP lookup techniques are known in the art and will not be elaborated here.

Other approaches to obtaining (304) the rough location of the mobile device are also contemplated. For example, the IP address of the access point (AP) (e.g., WiFi or WiMax AP) that communicates with the mobile device may be employed to ascertain the rough location of the mobile device. As another example, the identity of the transmitter/receiver that communicates with the mobile device may be employed to ascertain the rough location of the mobile device. As another example, the identity of the cellular transmission tower(s) that communicate(s) with the mobile device may be employed to ascertain the rough location of the mobile device. Thus, one or more approaches to determining the rough location of the mobile device may be implemented, singularly or simultaneously, in a given mobile device in order to allow the mobile device to provide the IAIE-GPSP functionalities across different networks and protocols.

The coarse location information furnished by the mobile device and/or obtained by the IAIE-GPSP PDE is then employed to formulate a session response. The session response includes aiding information such as the synchronization timing information (312) and ephemeris information (314) of the candidate GPS satellites for searching (which is a selected subset of all available GPS satellites and which is selected based on the coarse location data for the mobile device). For example, the synchronization timing information may represent NTP time that is keyed to absolute GPS time (which in turn is keyed to GMT time). The timing information, being based on the well-established NTP methodology, allows the mobile device to efficiently synchronize itself for GPS acquisition purposes and in a manner that is free of the telecommunication network constraints/specifics (such as CDMA time, CDMA offset calculations, etc).

With the aiding information, the IAIE-GPSP mobile device can then more rapidly acquire the required GPS signal to calculate its GPS location. To conserve power and/or to more rapidly acquire a GPS location, the IAIE-GPSP mobile device may provide the raw GPS signal to the IAIE-GPSP PDE or other servers or nodes to allow the IAIE-GPSP PDE or other servers or nodes to calculate the GPS location on behalf of the mobile device. If a GPS fix is not possible, the IAIE-GPSP mobile device may report accordingly. In this case, another GPS positioning methodology (such as the prior art CDMA-based technique) may be attempted or the GPS positioning attempt may be aborted altogether.

Figure 4:
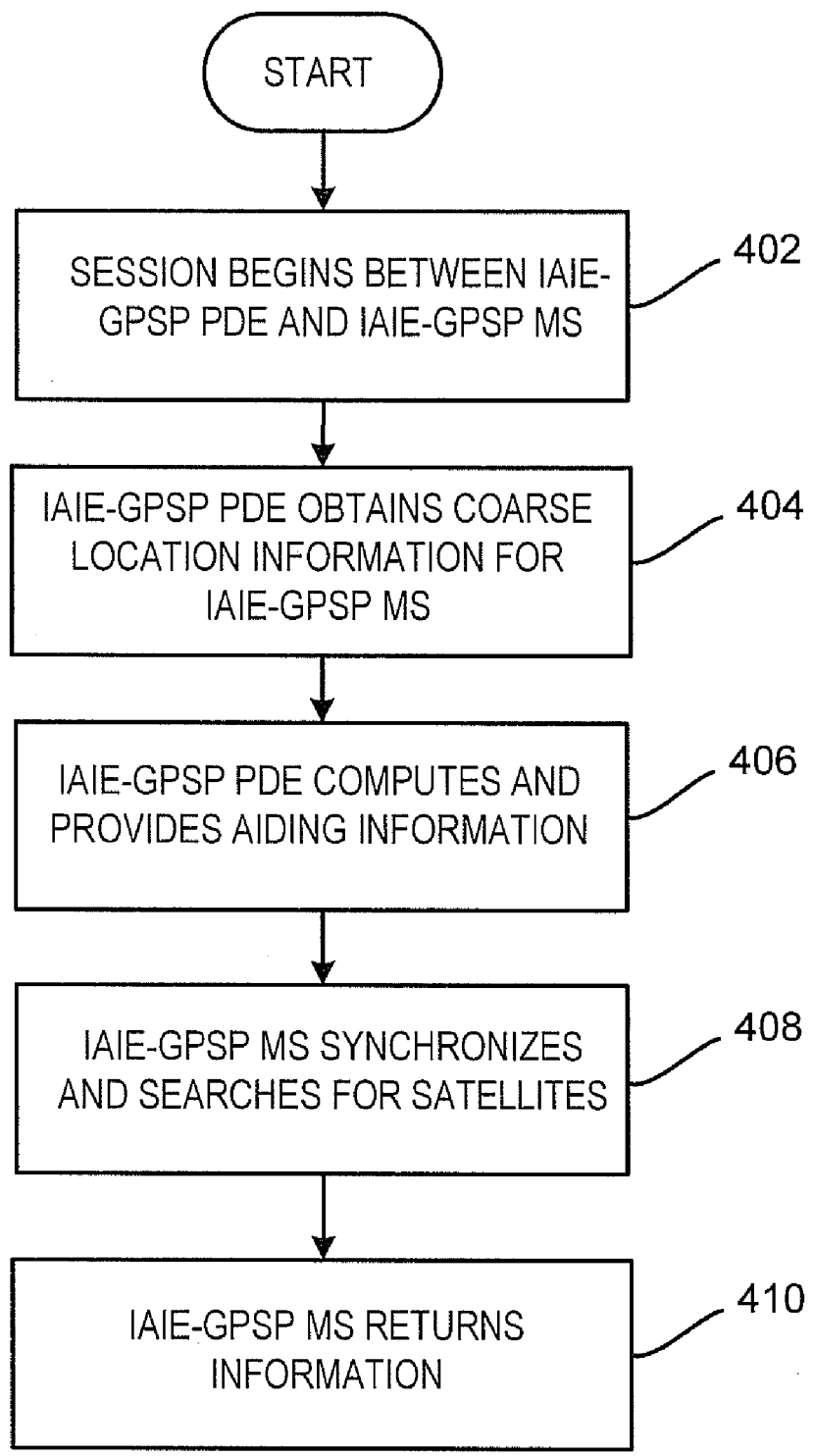
FIG. 4 shows, in accordance with one or more embodiments of the present invention, the simplified steps for implementing the packet-based IAIE-GPSP technique.

FIG. 4 shows, in accordance with one or more embodiments of the present invention, the simplified steps for implementing the packet-based IAIE-GPSP technique. In step 402, a session is initiated either by the mobile device or by the IAIE-GPSP PDE.

In step 404, the IAIE-GPSP PDE obtains the coarse location information for the mobile device (e.g., from the IP address of the mobile device or via another approach as discussed earlier). Note that unlike the prior art that relies on cell tower triangulation, AFLT computation, or other specific network-dependent techniques for determining the coarse location of the mobile device, the IAIE-GPSP technique is designed to obtain the coarse information in a way or in ways that are agnostic to specific telecommunication networks and protocols (such as CDMA).

Instep 406, the AIE-GPSP PDE computes and provides aiding information to the IAIE-GPSP circuitry in the mobile device. The computation of certain portions of the aiding information from a coarse location, such as the determination of the candidate GPS satellites and their GPS ephemeris data, is known and is not further elaborated here. A portion of the aiding information pertains to the GPS time, which may be obtained using for example NTP. Again, note that unlike the prior art that relies on network-specific time (e.g., CDMA time) for synchronization, the IAIE-GPSP technique is designed to synchronize time in a way or in ways that are agnostic to specific telecommunication networks and protocols (such as CDMA timing).

Using the aiding information, the IAIE-GPSP circuitry in the mobile device then, in step 408, synchronizes itself and searches for the candidate GPS satellites (which are identified in the aiding information). In step 410, the mobile device may return the raw GPS data, or the calculated GPS location data, or may simply report that GPS position fixing using IAIE-GPSP is not possible. As mentioned, in this case, another GPS positioning methodology (such as the prior art CDMA-based technique) may be attempted or the GPS positioning attempt may be aborted altogether.

Generally speaking, the IAIE-GPSP circuitry in the mobile device may include at least dedicated or programmable circuitry for transmitting IP packets to the IAIE-GPSP PDE during the communication session. The IAIE-GPSP circuitry in the mobile device may also include at least dedicated or programmable circuitry for receiving IP packets that carry the aiding information from the IAIE-GPSP PDE. Further, the IAIE-GPSP circuitry in the mobile device may also include at least dedicated or programmable circuitry for acquiring the GPS signals for one or more of the candidate satellites based on the aiding information provided by the IAIE-GPSP PDE. The selection and implementation of specific dedicated or programmable circuitry to accomplish the foregoing in a mobile device is within the skills of one skilled in the art.

Likewise, circuitry in the IAIE-GPSP PDE may include at least dedicated or programmable circuitry for receiving IP packets from the IAIE-GPSP circuitry of the mobile device. Circuitry in the IAIE-GPSP PDE may also include at least dedicated or programmable circuitry for computing the coarse location of the mobile device based at least in part on information received during the communication session with the mobile device. Circuitry in the IAIE-GPSP PDE may also include at least dedicated or programmable circuitry for formulating aiding information based at least in part on the computed coarse location. As mentioned, the aiding information may include at least the synchronization timing information and the ephemeris information for the candidate GPS satellites. Circuitry in the IAIE-GPSP PDE may also include at least dedicated or programmable circuitry for transmitting the aiding information to the mobile device. The selection and implementation of specific dedicated or programmable circuitry to accomplish the foregoing in the IAIE-GPSP PDE is within the skills of one skilled in the art.

While this invention has been described in terms of several preferred embodiments, there are alterations, permutations, and equivalents, which fall within the scope of this invention. Although various examples are provided herein, it is intended that these examples be illustrative and not limiting with respect to the invention. For example, although the examples herein mention CDMA for discussion purposes, the IAIE-GPSP circuitry and the IAIE-GPSP PDE can be employed with any electronic device that employs any communication protocol (such as any of the TDMA protocols including GSM and/or PHS, as well as any other protocol, alone or in combination) since the invention is independent of and agnostic to all protocols. TDMA is an acronym for Time-Division-Multiple-Access, which includes the aforementioned GSM (Global System for Mobility) and PHS (Personal Handyfone System).

Also, the title and summary are provided herein for convenience and should not be used to construe the scope of the claims herein. Further, the abstract is written in a highly abbreviated form and is provided herein for convenience and thus should not be employed to construe or limit the overall invention, which is expressed in the claims. If the term "set" is employed herein, such term is intended to have its commonly understood mathematical meaning to cover zero, one, or more than one member. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. A method for implementing global positioning system (GPS) positioning for an electronic device, comprising:
    providing a positioning determining entity (PDE);
    establishing a communication session between said PDE and said electronic device, said communication session being accomplished via a first plurality of IP (Internet Protocol) packets;
    determining, using said PDE, a coarse location for said electronic device responsive to information obtained via said communication session;
    formulating aiding information based at least in part on said coarse location, said aiding information formulated by said PDE and including at least synchronization timing information and ephemeris information pertaining to a plurality of selected GPS satellites, said plurality of selected GPS satellites being a subset of all available GPS satellites; and
    transmitting said aiding information from said PDE to said electronic device via a second plurality of IP packets, said aiding information configured to assist said electronic device in acquiring GPS signals from at least one of said plurality of selected GPS satellites.

2. The method of claim 1 wherein said synchronization timing information is based on absolute GPS time.

3. The method of claim 1 wherein said synchronization timing information is formulated in a manner that is independent of network-specific time.

4. The method of claim 1 wherein said coarse information is derived from a source IP address of one of said first plurality of IP packets.

5. The method of claim 1 wherein said coarse information is derived from information pertaining to a WiFi access point employed to communicate with said electronic device.

6. The method of claim 1 wherein said coarse information is derived from information pertaining to a WiMax access point employed to communicate with said electronic device.

7. The method of claim 1 wherein said electronic device represents a cellular mobile handset.

8. The method of claim 1 wherein said electronic device represents a cellular mobile handset and said coarse information is obtained without employing information pertaining to cellular transmitter location.

9. The method of claim 1 wherein said electronic device represents a CDMA (Code Division Multiple Access) cellular mobile handset.

10. In an electronic device, a method for implementing global positioning system (GPS) positioning with the assistance of a positioning determining entity (PDE), comprising:
    establishing a communication session between said electronic device and said PDE, said communication session involving transmitting a first plurality of IP (Internet Protocol) packets from said electronic device to said PDE, information exchanged during said communication being configured to assist said PDE in establishing coarse location information for said electronic device;
    receiving a second plurality of IP packets from said PDE, said second plurality of IP packets including at least aiding information, said aiding information including at least synchronization timing information and ephemeris information pertaining to a plurality of selected GPS satellites, said plurality of selected GPS satellites being a subset of all available GPS satellites; and
    acquiring GPS signals from at least one of said plurality of selected GPS satellites using said aiding information.

11. The method of claim 10 wherein said synchronization timing information is based on absolute GPS time.

12. The method of claim 10 wherein said synchronization timing information is formulated in a manner that is independent of network-specific time.

13. The method of claim 10 wherein said aiding information is based at least in part on said coarse information derived by said PDE from a source IP address of one of said first plurality of IP packets.

14. The method of claim 10 wherein said aiding information is based at least in part on said coarse information derived by said PDE from information pertaining to a WiFi access point employed to communicate with said electronic device.

15. The method of claim 10 wherein said aiding information is based at least in part on said coarse information derived by said PDE from information pertaining to a WiMax access point employed to communicate with said electronic device.

16. The method of claim 10 wherein said electronic device represents a cellular mobile handset.

17. The method of claim 10 wherein said electronic device represents a CDMA (Code Division Multiple Access) cellular mobile handset.

18. A circuit for implementing global positioning system (GPS) positioning in an electronic device with the assistance of a positioning determining entity (PDE), comprising:

- means for transmitting a first plurality of IP (Internet Protocol) packets to said PDE from said electronic device, said first plurality of IP packets including information configured to assist said PDE in establishing coarse location information for said electronic device;
- means for receiving a second plurality of IP packets from said PDE, said second plurality of IP packets including at least aiding information, said aiding information including at least synchronization timing information and ephemeris information pertaining to a plurality of selected GPS satellites, said plurality of selected GPS satellites being a subset of all available GPS satellites; and
- means for acquiring GPS signals from at least one of said plurality of selected GPS satellites using said aiding information.

19. The circuit of claim 18 wherein said synchronization timing information is based on absolute GPS time.

20. The circuit of claim 18 wherein said synchronization timing information is formulated in a manner that is independent of network-specific time.

21. The circuit of claim 18 wherein said aiding information is based at least in part on said coarse information derived by said PDE from a source IP address of one of said first plurality of IP packets.

22. The circuit of claim 18 wherein said aiding information is based at least in part on said coarse information derived by said PDE from information pertaining to a WiFi access point employed to communicate with said electronic device.

23. The circuit of claim 18 wherein said aiding information is based at least in part on said coarse information derived by said PDE from information pertaining to a WiMax access point employed to communicate with said electronic device.

24. The circuit of claim 18 wherein said electronic device represents a cellular mobile handset.

25. The circuit of claim 18 wherein said electronic device represents a CDMA (Code Division Multiple Access) cellular mobile handset.

\* \* \* \* \*